Figure 1:
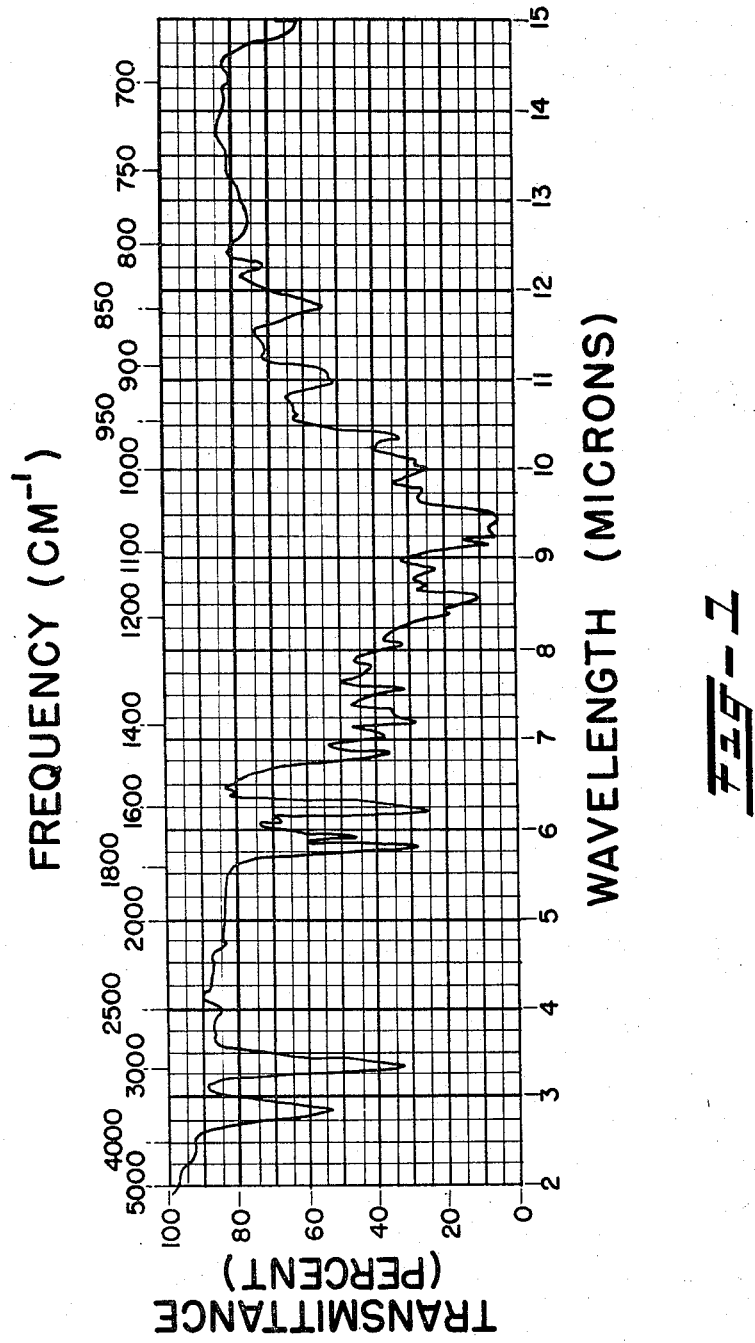

INVENTORS
HOWARD ARNOLD WHALEY
ERNEST LEONARD PATTERSON
ANTHONY JOSEPH SHAY
HOMER DAVID TRESNER
BY
ATTORNEY

United States Patent Office 3,344,024
Patented Sept. 26, 1967

3,344,024
ANTIBIOTIC AM-684 AND METHOD OF PRODUCTION
Howard Arnold Whaley, Spring Valley, Ernest Leonard Patterson and Anthony Joseph Shay, Pearl River, and Homer David Tresner, New City, N.Y., assignors to American Cyanamid Company, Stamford, Conn., a corporation of Maine
Filed Apr. 17, 1963, Ser. No. 273,764
9 Claims. (Cl. 167—65)

This application is a continuation-in-part of our copending application Serial No. 230,155, filed October 12, 1962, now abandoned.

This invention relates to a new antibiotic, to its production by fermentation, to methods for its recovery and concentration from crude solutions, to processes for its purification and to methods for the preparation of its salts.

The present invention includes within its scope the antibiotic in dilute forms, as crude concentrates, and in pure crystalline forms. These novel products are active against a variety of microorganisms including gram-positive bacteria. The effects of the new antibiotic on specific microorganisms, together with the chemical and physical properties of the antibiotic differentiate it from previously described antibiotics.

The new antibiotic which we have termed AM-684 is formed during the cultivation under controlled conditions by a new strain of *Streptomyces hygroscopicus* and by a new species of microorganism to which we have given the binomial *Streptomyces griseospiralis*. The following is a general description of the new strain of *Streptomyces hygroscopicus* based on the diagnostic characteristics observed. The italicized descriptive colors are those of Ridgway, "Color Standards and Color Nomenclature."

*Amount of growth.*—Moderate to good on most media; very light on Czapek's solution agar.

*Aerial mycelium and/or spore color.*—Spores en masse are in shades of *Light Mouse Gray* to *Benzo Brown* on media supporting good sporulation. Spore masses become black and hygroscopic in age.

*Soluble pigments.*—No soluble pigments formed on most media; light yellowish on tomato paste agars.

*Reverse color.*—In yellowish to light brown shades on most media.

*Miscellaneous physiological reactions.*—Nitrates reduced to nitrites; liquefies gelatin; and is non-chromogenic on peptone-iron agar (Difco). Moderate to good utilization of the following carbon sources: l-arabinose, d-fructose, i-inositol, lactose, d-mannitol, d-trehalose, d-xylose and dextrose; poor or non-utilization of adonitol, dextran, d-melezitose, d-melibiose, d-raffinose, l-rhamnose, salacin, and sucrose.

*Morphology.*—Sporophores arising as tight spirals of a few turns. Spirals become less distinct and hygroscopic with age. Spores smooth-walled, mostly elliptical, $0.8$–$1.0\mu \times 1.3$–$1.5\mu$.

The cultural, morphological, and physiological characteristics of the new strain of *Streptomyces hygroscopicus* are set forth in the following tables. The italicized descriptive colors are taken from Ridgway.

TABLE 1.—CULTURAL CHARACTERISTICS OF NEW STRAIN OF *S. HYGROSCOPICUS*

[Incubation: 14 days; Temperature: 28°]

| Medium | Amount of Growth | Aerial Mycelium and Spores | Soluble Pigment | Reverse Color | Remarks |
|---|---|---|---|---|---|
| Czapek's Solution Agar | Very light | Trace of aerial growth. No sporulation. | None | Colorless | Growth very thin, spreading. |
| Tomato Paste Agar | Moderate | Aerial mycelium whitish, becoming *Benzo Brown* in sporulating areas. Sporulation very light. | Yellowish, light. | *Cream-Buff* | |
| Bennett's Agar | do | Aerial mycelium white with patches of *Benzo Brown* sporulation. Sporulation light. | None | *Cream-Buff* | Some hygroscopic spore masses. |
| Asparagine Dextrose Agar | do | Aerial mycelium whitish. No visible sporulation. | do | *Marguerite Yellow*. | |
| Hickey and Tresner's Agar | Good | Aerial mycelium white, but becoming *Benzo Brown* in sporulation zones. Sporulation moderate. | do | *Snuff Brown* | Colonies conspicuously hygroscopic in central zones. |
| Carvajal's Oatmeal Agar | do | Aerial mycelium whitish, becoming *Light Mouse Gray* to *Benzo Brown* in sporulation zones. Sporulation moderate. | do | *Chamois* | |
| Potato Dextrose Agar | Moderate | Aerial mycelium whitish, becoming *Benzo Brown* in sporulating areas. Sporulation moderate. | do | *Tawny-Olive* | |
| Tomato Paste Oatmeal Agar | do | Aerial mycelium whitish, becoming *Benzo Brown* in sporulating areas. Sporulation good. | Yellowish; light. | *Vandyke Brown* | Hygroscopic spore masses in central areas. |
| Yeast Extract Agar | do | Aerial mycelium whitish, becoming *Benzo Brown* in sporulating zones. Sporulation moderate. | None | *Olive-Brown* | Some hygroscopic areas. |
| Inorganic Salts Starch Agar | do | Aerial mycelium white. *Light Mouse Gray* in sporulation areas. Sporulation light. | do | *Colonial Buff* | |
| Oat Flake Agar | do | Aerial mycelium white. Sporulation *Benzo Brown*, light. | do | *Colonial Buff* | |

TABLE 2.—MORPHOLOGICAL CHARACTERISTICS

| Medium | Aerial Mycelium and Sporiferous Structures | Spore Shape | Spore Size |
|---|---|---|---|
| Tomato Paste Oatmeal Agar. | Sporophores arising as tight spirals of a few turns. Spirals becoming less distinct and hygroscopic with age. | Mostly elliptical smooth-walled. | $0.8$–$1.0\mu \times 1.3$–$1.5\mu$. |

TABLE 3.—MISCELLANEOUS PHYSIOLOGICAL TESTS

| Medium | Days | Amount of Growth | Results |
|---|---|---|---|
| Organic Nitrate Broth | 7 | Good | Nitrates reduced to nitrites. |
|  | 14 | do | Do. |
| Synthetic Nitrate Broth | 7 | Slight | Do. |
|  | 14 | do | Do. |
| Gelatin | 7 | Good | Partial liquefaction. |
|  | 14 | do | Complete liquefaction. |
| Iron-peptone Agar (Difco) |  | Good | No chromogenicity. |

TABLE 4.—CARBON SOURCE UTILIZATION

C-source: Utilization [1]

```
Adonitol ------------------------------------- 0
l-Arabinose --------------------------------- 2
Dextran ------------------------------------- 1
d-Fructose ---------------------------------- 3
i-Inositol ----------------------------------- 3
Lactose ------------------------------------- 2
d-Mannitol ---------------------------------- 3
d-Melezitose -------------------------------- 0
d-Melibiose --------------------------------- 0
d-Raffinose --------------------------------- 0
l-Rhamnose --------------------------------- 0
Salicin -------------------------------------- 1
Sucrose ------------------------------------- 0
d-Trehalose --------------------------------- 3
d-Xylose ------------------------------------ 3
Dextrose ------------------------------------ 2
```

[1] 0=No utilization; 1=Poor utilization; 2=Fair utilization; 3=Good utilization.

This new strain is a member of the most common-place group of the Streptomycetes, namely, those having en masse spore shades in gray to brownish. This organism has a familiar set of features that unmistakingly distinguish it as a strain of the species *Streptomyes hygroscopicus*. Most noteworthy among these characteristics is the black hygroscopic appearance of the spore masses in older cultures, the small tightly wound spiral chains of smooth-walled spores and the lack of chromogenicity on peptone-iron agar (Difco). A comparison of the essential taxonomic details of the new strain with the culture description of *Streptomyces hygroscopicus* [Waksman, "The Actinomycetes," vol. II, Classification, Identification and Descriptions of Genera and Species (1961)] and with reference syntypic strains of the species confirms the identification.

The following is a general description of the organism *S. griseospiralis* based on the diagnostic characteristics observed. Detailed observations appear in Tables 5, 6, 7 and 8 below. Italicized descriptive colors are taken from Ridgway, "Color Standards and Color Nomenclature."

*Amount of growth.*—Moderate to good on most media; light on Czapek's solution agar.

*Aerial mycelium and/or en masse spore color.*—Aerial mycelium whitish, becoming *Drab Gray* to *Pale Drab-Gray* or *Light Drab* in sporulation zones on most media.

*Soluble pigment.*—Produced in light amounts in yellowish to yellowish-brown shades on a few media; absent in others.

*Reverse color.*—In yellowish to brownish shades on most media.

*Miscellaneous physiological reactions.*—Nitrate reduced to nitrite on synthetic nitrate broth; partial liquefaction of gelatin; and no chromogenicity on peptone-iron agar. Carbon source utilization according to the Pridham et al. method as follows: Good to fair utilization of sucrose and dextrose; poor to non-utilization of i-inositol, lactose, d-mannitol, adonitol, l-arabinose, dextran, d-fructose, d-melezitose, d-melibiose.

*Morphology.*—Aerial mycelium gives rise to loose, extended openly spiralled spore chains, commonly of several turns. Spores elliptical (0.8–0.9μ x 1.2–1.5μ). Spore surfaces smooth as observed by electron microscopy.

Various taxonomic keys to the Streptomycetes were consulted in attempting to classify this soil isolate, and actual comparisons were also made with numerous reference cultures of organisms which bore resemblance to this isolate. After failing to ally the isolate with any of the presently described species, it was concluded that a new species epithet should be selected for this culture. In keeping with good nomenclatural practices, the binomial *S. griseospiralis* was chosen to be descriptive of the spiralled chains of gray spores possessed by the organism.

TABLE 5.—CULTURAL CHARACTERISTICS OF *STREPTOMYCES GRISEOSPIRALIS*

[Incubation: 14 days; Temperature: 28° C.]

| Medium | Amount of Growth | Aerial Mycelium and/or Spores | Soluble Pigment | Reverse Color | Remarks |
|---|---|---|---|---|---|
| Czapek's Solution Agar | Light | Aerial mycelium whitish, becoming light brownish in areas of sporulation. Sporulation very light. | None | Whitish |  |
| Tomato Paste Agar | Good | Aerial mycelium whitish to yellowish, becoming *Drab-Gray* in sporulation zones. Sporulation moderate. | do | Honey Yellow |  |
| Bennett's Agar | do | Aerial mycelium white, becoming *Pale Drab-Gray* to *Drab Gray* in sporulation areas. Sporulation moderate. | do | Saccardo's Umber |  |
| Asparagine Dextrose Agar | Moderate | Aerial mycelium whitish, becoming *Pale Drab-Gray* in sporulation zones. Sporulation light. | do | Tawny-Olive |  |
| Hickey and Tresner's Agar | Good | Aerial mycelium whitish, becoming *Drab-Gray* to *Light Drab* in sporulation zones. Sporulation heavy. | do | Bister | Sectoring prominently. |
| Carvajal's Oatmeal Agar | Moderate | Aerial mycelium whitish, becoming *Pale Drab-Gray* in sporulation zones. Sporulation light. | Light; yellowish. | Chamois |  |
| Potato Dextrose Agar | Good | Aerial mycelium whitish, becoming *Drab-Gray* to *Light Drab* in sporulation zones. Sporulation very heavy. | do | Bone Brown | Sectoring prominently. |
| Tomato Paste Oatmeal Agar | do | Aerial mycelium whitish, becoming *Drab-Gray* in sporulation zones. Sporulation very heavy. | do | Bone Brown | Occasional sectors. |
| Yeast Extract Agar | do | Aerial mycelium whitish, becoming *Drab-Gray* in sporulation zones. Sporulation very heavy. | do | Bone Brown |  |
| Inorganic Salts Starch Agar | Moderate | Aerial mycelium whitish, becoming *Drab-Gray* in sporulation zones. Sporulation light. | None | Cream-Buff | Sectoring prominently. |
| Oat Flake Agar | do | Aerial mycelium whitish, becoming *Pale Drab-Gray* to *Drab-Gray* in sporulation zones. Sporulation moderate. | Light; yellowish-brown. | Benzo Brown |  |

TABLE 6.—MICROMORPHOLOGY OF STREPTOMYCES GRISEOSPIRALIS

| Medium | Aerial Mycelium and/or Sporiferous Structures | Spore Shape | Spore Size | Spore Surface |
|---|---|---|---|---|
| Inorganic Salts Starch Agar | Aerial mycelium gives rise to loose, openly spiralled sporiferous appendages, frequently of several turns. | Spores elliptical | 0.8–0.9µ x 1.2–1.5µ | Spore surface smooth, as observed by electron microscopy. |

TABLE 7.—MISCELLANEOUS PHYSIOLOGICAL REACTIONS OF *STREPTOMYCES GRISEOSPIRALIS*

[Temperature: 28° C.]

| Medium | Incubation Period | Amount of Growth | Physiological Reaction |
|---|---|---|---|
| Organic Nitrate Broth | 7 days | Heavy | Nitrate not reduced. |
| Do | 20 days | do | Do. |
| Synthetic Nitrate Broth | 7 days | Moderate | Nitrate reduced to nitrate. |
| Do | 20 days | do | Do. |
| Gelatin | 7 days | do | Partial liquefaction. |
| Do | 20 days | do | Do. |
| Iron-peptone | 24 hours | do | No chromogenicity. |

TABLE 8.—CARBON SOURCE UTILIZATION PATTERN OF *STREPTOMYCES GRISEOSPIRALIS*

[Incubation: 10 days; Temperature: 28° C.]

| Carbon source: | Utilization [1] |
|---|---|
| Adonitol | 0 |
| l-Arabinose | 0 |
| Dextran | 0 |
| d-Fructose | 0 |
| i-Inositol | 1 |
| Lactose | 1 |
| d-Mannitol | 1 |
| d-Melezitose | 0 |
| d-Melibiose | 0 |
| d-Raffinose | 0 |
| l-Rhamnose | 0 |
| Salicin | 0 |
| Sucrose | 2 |
| d-Trehalose | 0 |
| d-Xylose | 0 |
| Dextrose | 2 |
| Negative control | 0 |

[1] 3=Good utilization; 2=Fair utilization; 1=Poor utilization; 0=No utilization.

Viable cultures of the new strain of *S. hygroscopicus* and *S. griseospiralis* have been deposited with the Culture Collection Laboratory, Northern Utilization Research and Development Division, United States Department of Agriculture, Peoria, Illinois, and have been added to its permanent collection as NRRL 3017 and NRRL 3018, respectively.

It is to be understood that for the production of the new antibiotic of this invention, the present invention is not limited to these particular organisms or to organisms fully answering the above growth and microscopic characteristics which are given for illustrative purposes. In fact, it is desired and intended to include the use of mutants produced from the described organisms by various means, such as X-radiation, ultraviolet radiation, nitrogen mustard, phage exposure and the like.

*Fermentation process*

The cultivation of the organisms *S. hygroscopicus* and *S. griseospiralis* may take place in a variety of liquid culture media. Media which are useful for the production of the novel antibiotic include an assimilable source of carbon such as starch, sugar, molasses, glycerol, etc., an assimilable source of nitrogen such as protein, protein hydrolysate, polypeptides, amino acids, corn steep liquor, etc. and inorganic anions and cations, such as potassium, sodium, calcium, sulfate, phosphate, chloride, etc. Trace elements such as boron, molybdenum, copper, etc., are supplied as needed in the form of impurities by other constituents of the media. Aeration in tanks and bottles is provided by forcing sterile air through or onto the surface of the fermenting medium. Further agitation is provided in tanks, by a mechanical impeller. An antifoaming agent, such as 1% octadecanol in lard oil, may be added as needed.

*Shaker flask fermentation*

For shaker flask fermentations with *S. hygroscopicus*, 100 milliliter portions of the following liquid inoculum in 500 milliliter flasks are inoculated with an agar slant of the culture.

| Liquid inoculum: | Grams per liter |
|---|---|
| Beef extract | 4 |
| Glucose | 10 |
| Yeast extract | 1 |
| Bactopeptone | 4 |
| Sodium chloride | 2.5 |

The flasks are incubated on a reciprocating shaker and agitated vigorously for 24 to 72 hours, usually for 72 hours.

*Tank fermentation*

For the production of the antibiotic in tank fermentors the following fermentation medium is preferably used.

| Fermentation medium: | Grams per liter |
|---|---|
| Proflo | 40 |
| Lactose | 20 |
| Potassium chloride | 0.5 |
| Sodium chloride | 5 |
| Calcium carbonate | 7.5 |
| Magnesium sulfate 7H$_2$O | 5 |

Each tank is inoculated with from 0.1 to 10%, inclusive, of a culture broth fermented as described above for shaker flask fermentation. Aeration is supplied at the rate of 0.2–2.0 volumes, inclusive, of sterile air per volume of broth per minute and the broth is agitated by an impeller driven at about 100–300 r.p.m. The temperature is maintained at 20–35° C., usually at 28° C. The fermentation is preferably continued for a period from 80–150 hours, at which time the mash is harvested.

For fermentation of *S. griseospiralis*, it is only necessary to change the liquid inoculum and the fermentation medium to the following formulas:

| Liquid inoculum: | Grams per liter |
|---|---|
| Soy bean oil meal | 10 |
| Corn steep liquor | 5 |
| Calcium carbonate | 3 |
| Glucose | 20 |

| Fermentation medium: | |
|---|---|
| Bactopeptone | 5 |
| Glucose | 10 |
| Molasses | 20 |
| Calcium carbonate | 1 |

*Purification procedure*

After the fermentation is completed, the culture broth containing the antibiotic of this invention is preferably filtered at pH 7 to remove the mycelium from the broth. Diatomaceous earth or any of the conventional filtration aids may be used to assist the filtration which is carried out using standard equipment. Thereafter, the antibiotic may be recovered from the filtrate by appropriate extraction procedure.

The antibiotic of this invention may be extracted from the filtrate with chloroform, concentrated in vacuo to approximately 1/1,000 of the original volume, and then added to petroleum ether. The resulting precipitate is obtained by centrifugation and decantation.

The petroleum ether precipitate is then dissolved in chloroform and thereafter passed through a silica gel column, using methanol-chloroform as a developer. The pooled eluates are then concentrated in vacuo and the resultant residue dissolved in ether from which the antibiotic may be crystallized.

Alternatively, the hydrochloride salt from ether is prepared with hydrogen chloride before crystallization is effected.

The novel antibiotic of the invention is composed of the elements carbon, hydrogen, nitrogen, and oxygen and on elemental analyses gives the following average proportions:

Carbon _____ 59.50
Hydrogen _____ 8.71
Nitrogen _____ 1.79
Oxygen _____ 29.35

Calculated molecular weight 904. Found by vapor pressure method 888.

The percent of methyl groups attached to an oxygen is 3.38 (as $CH_3$), the percent of methyl groups attached to a carbon is 10.27 (as $CH_3$), and the percent of methyl groups attached to a nitrogen is 2.60 (as $CH_3$). The percent acetyl groups is 2.51. $pK_a$ is 6.95 (66% dimethylformamide). The product has a melting point of 172–174.5° C. and an optical rotation of $[\alpha]_D^{25°} -48.7°$ (C=0.906 methanol). Ultraviolet maximum at 282 m$\mu$ $$(E_{1\,cm}^{1\%} = 245)$$

in methanol. An infrared absorption spectrum of the new antibiotic is prepared in a standard manner by dissolving in chloroform. The compound exhibits characteristic absorption in the infrared region of the spectrum at the following wavelengths expressed in microns: 2.84, 3.36, 5.80, 5.93, 6.08, 6.24, 6.82, 7.03, 7.22, 7.32, 7.56, 7.80, 8.05, 8.40, 8.56, 8.71, 8.90, 9.19, 9.43, 9.80, 10.0, 10.35, 11.0, 11.80, and 12.26. The infrared curve is shown in FIGURE 1 of the accompanying drawings.

Figure 2:
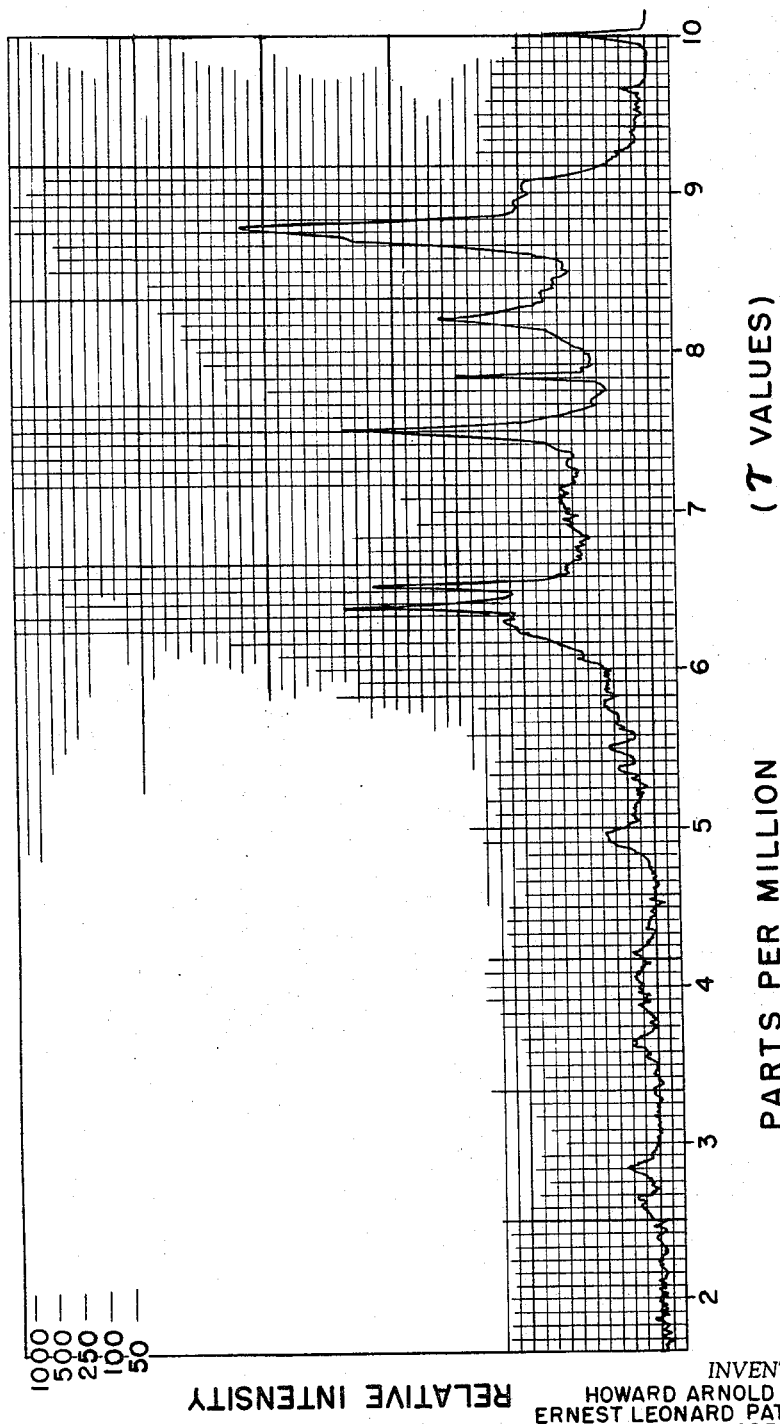

A proton magnetic resonance spectrum of the antibiotic AM-684 was prepared with a Varian A-60 spectrometer at 60 megacycles in the customary manner by dissolving in deuterochloroform containing tetramethylsilane, chloroform, and acetone as internal standards. The compound presents a characteristic complex absorption pattern with principal features occurring at the following frequencies expressed in $\tau$ (tau) units: 8.77, 8.21, 7.51, 6.52, and 6.39. The resonance spectrum is shown in FIGURE 2 of the accompanying drawings.

In a solvent system consisting of isopropyl ether (10 parts), methyl isobutyl ketone (5 parts) and 2% aqueous ammonium carbonate (10 parts), the Rf value of the new antibiotic is about 0.24. The product is soluble in lower alcohols such as methanol, and ethanol, and in acetone, ethyl acetate, methyl isobutyl ketone, chloroform, and methylene chloride. It is less soluble in ether and water and insoluble in hydrocarbons. The product is rapidly destroyed at pH 10 and a temperature of 70° C.

The antimicrobial spectrum of the new antibiotic is shown in Tables 9 and 10 below.

TABLE 9.—IN VITRO ANTIMICROBIAL SPECTRA BY AGAR DIFFUSION METHOD [1]

| | AM-684 Hydrochloride 100 mcg./ml. | Hydrolysis Product AM-684-HP 200 mcg./ml. |
|---|---|---|
| Bacillus cereus | 6.9 | 6.1 |
| Klebsiella pneumoniae (Friedlander's) | 0 | 1.9 |
| Bacillus subtilis | 10.0 | 7.1 |
| Bacillus subtilis (pH 6 agar) | 4.4 | Slight |
| Bacillus subtilis (resistant to Streptothricin) | 5.9 | 7.1 |
| Staphylococcus aureus (resistant to Tetracyclines) | 3.8 | 6.1 |
| Streptococcus pyogenes—NY5 | 7.5 | 8.9 |
| Corynebacterium xerosis NRRL B-1397 | 10.4 | 12.0 |
| Staphylococcus aureus, strain Smith | 5.0 | 6.4 |

[1] The figures below refer to the distance in mm. from the agar well to the outer zone of inhibition.

TABLE 10.—MINIMAL INHIBITORY CONCENTRATION SPECTRA [1]

| Organism: | AM-684 mcg./ml. |
|---|---|
| Staphylococcus sp. 4050B-122#3 | 12.5 |
| Mycobacterium smegmatis ATCC 607 | >100 |
| Staphylococcus aureus 209P | 25 |
| Streptococcus faecalis ATCC 8043 | >100 |
| Bacillus subtilis ATCC 6633 | 1.5 |
| Streptococcus pyogenes C-203 | 3.1 |
| Streptococcus sp. $\gamma$-nonhemolytic #11 | >100 |
| Staphylococcus aureus #69 | 12.5 |
| Streptococcus sp. $\beta$-hemolytic #80 | >100 |
| Staphylococcus aureus NY 104 | >100 |
| Bacillus cereus ATCC 10702 | 1.5 |
| Pseudomonas aeruginosa ATCC-10145 | >100 |
| Proteus vulgaris ATCC-9484 | >100 |
| Escherichia coli ATCC-9637 | >100 |
| Salmonella gallinarum Led. An. Ind. 604 | >100 |
| Staphylococcus aureus Rose ATCC 14154 | 12.5 |

[1] Agar streak dilution test.

The novel antibiotic of this invention is active against gram-positive microorganisms such as streptococci, pneumococci and staphylococci. The new antibiotic is thus potentially useful as a therapeutic agent in treating bacterial infections in humans and animals caused by such microorganisms. The new antibiotic can be usefully employed for controlling such infections by topical application or internal administration.

The usefulness of the novel antibiotic is demonstrated by its ability to control systemic lethal infections in mice. The new antibiotic of this invention shows high antibacterial in vivo activity in mice against Staphylococcus aureus, strain Smith, and Streptococcus pyogenes C-203 when administered to groups of Carworth Farms $CF_1$ male mice, weight 18–22 grams infected with a lethal dose of these bacteria in a $10^{-1}$ trypticase soy (TSP) broth dilution of a five-hour TSP blood broth culture. Although the novel antibiotic of this invention has not as yet been clinically demonstrated to be useful in human therapy, the conditions of the tests in mice against human pathogens show a high probability of useful activity in humans. Table 11 below shows the in vivo antibacterial activity of the new antibiotic.

TABLE 11.—IN VIVO ANTIBACTERIAL ACTIVITY

| Test System | Dosage, mg./kg. body wt. | AM-684 tartrate | |
|---|---|---|---|
| | | S.O.D.[1] | S.S.C.[1] |
| Staphylococcus aureus, strain Smith | 640 | [2] 2/5 | [3] 4/5 |
| | 320 | | |
| | None | | |
| Streptococcus pyogenes C-203 | 640 | 0/5 | |
| | | 1/5 | |
| | None | 0/5 | |

[1] S.O.D. is Single Oral Dose. S.S.C. is Single Subcutaneous Dose.
[2] Number of survivors/number on test.
[3] Denotes prolongation of survival time.

The new antibiotic of this invention is also useful in the treatment of chronic respiratory disease (CRD) in chickens. Chronic respiratory disease is a respiratory infection of chickens and turkeys characterized by respiratory rales, coughing, and nasal discharge. The clinical manifestations are slow to develop and the disease has a long course. Chronic respiratory disease has become an important flock problem in all areas of the United States, and losses from this disease may be very costly to the producer. It is also present in Canada, Australia, Holland, South Africa and Brazil. *Mycoplasma gallisepticum* is the pathogenic avian pleuropneumonia-like organism (PPLO) causing chronic respiratory disease.

Antibiotics AM–684 and AM–684–HP are active when tested by single subcutaneous dosage at time of infection in six-day-old chicks infected via the left thoracic airsac with *Mycoplasma gallisepticum*. The antibiotics partially or wholly overcome this infection at dose levels of 0.5 and 5.0 mg./bird as shown below:

TABLE 12.—AVERAGE BIRD WEIGHTS (GRAMS) AT 21 DAYS POST-INFECTION WITH *MYCOPLASMA GALLISEPTICUM* STRAIN A-30

[20 Birds/test group]

| Uninfected Untreated | Infected Untreated | Infected-Antibiotic Treated | | | |
|---|---|---|---|---|---|
| | | AM-684 | | AM-684-HP | |
| | | 0.5 mg./Bird | 5.0 mg./Bird | 0.5 mg./Bird | 5.0 mg./Bird |
| 302 | 219 | ---------- | ---------- | 245 | 302 |
| 299 | 240 | 265 | 302 | ---------- | ---------- |
| 284 | 199 | 232 | 278 | ---------- | ---------- |
| 271 | 198 | ---------- | ---------- | 220 | 302 |

The invention will be described in greater detail in conjunction with the following specific examples.

EXAMPLE 1.—INOCULUM PREPARATION

A typical medium used to grow the primary inoculum is prepared according to the following formula:

```
                                                    Grams
Beef extract _____ 4
Glucose _____ 10
Yeast extract _____ 1
Bactopeptone _____ 4
Sodium chloride _____ 2.5
Water to 1,000 milliliters.
```

A yeast-malt agar slant of a culture of the new strain of *Streptomyces hygroscopicus* is incubated for a week. At this time the spores and mycelium are transferred to two 500 milliliter flasks which contain 100 milliliters of the above medium. The flasks are placed on a reciprocating shaker and agitated vigorously for 72 hours, at 28° C. The flask inocula are tranferred to 20 liter bottles, which contain 12 liters of the above liquid medium. These bottles are aerated for 48 hours to encourage further growth. At the end of this time the 20 liter bottles are used to seed fermentor tanks.

EXAMPLE 2.—FERMENTATION

A fermentation medium is prepared according to the following formula:

```
                                                    Grams
Proflo _____ 40
Lactose _____ 20
Potassium chloride _____ 0.5
Sodium chloride _____ 5
Calcium carbonate _____ 7.5
Magnesium sulfate, 7 H₂O _____ 5
Water to 1,000 milliliters.
```

The fermentation medium is sterilized at 120° C. with steam at 15 pounds pressure for 60 minutes. The pH of the medium before and after sterilization is between 7.0 and 7.8. 300 liters of the sterile medium in 100 gallon fermentors are inoculated with 12 liters of the bottle inoculum described above and the fermentation is carried out at 28° C. for 100 hours. The medium is agitated by an impeller operating at 200 revolutions per minute. At the end of the fermentation the mash is assayed.

EXAMPLE 3.—ISOLATION

Two hundred forty liters of fermented mash at pH 8.2 is adjusted to pH 6.8 and diatomaceous earth is added in the proportion 2% weight/volume. The mass is then filtered, the filter cake is washed with 40 liters of water and the pad is then discarded. The pooled water wash plus the filtrate is then adjusted to pH 7.4 (volume 230 liters; solids=39 mg./ml.=8970 grams total solids), extracted with 120 liters of chloroform, then extracted again with 100 liters of chloroform. The combined extracts (volume 220 liters) are concentrated to 1,000 ml. (solids=27.6 mg./ml.=27.6 grams total solids). Thereafter, the chloroform concentrate is concentrated further to 300 ml. and added to 3 liters of petroleum ether (30–60°) with stirring. The resultant precipitate is recovered by centrifugation then dissolved in absolute ethanol, and evaporated in vacuo to dryness (19.7 grams of brown solid). This brown solid is then dissolved in 200 ml. of chloroform and then poured on to a 500 gram silica gel column and chromatographed, eluting with increasing percentage of methanol in chloroform. The effluents from the column are pooled from in vitro data obtained by the agar diffusion plate method of assay using *B. subtilis* as the test organism. Based upon this criteria similar fractions are dissolved in ether, the resulting crystals are then pooled, treated with carbon and recrystallized from acetone-cyclohexane to give AM–684. The yield is 6.26 grams. The chemical analysis of this product and its other chemical, physical, and biological properties have already been described.

EXAMPLE 4.—MILD ACID TREATMENT OF AM–684

The antibiotic AM–684 is converted into a new biologically active substance designated AM–684–HP as follows: One gram of the compound is allowed to stand in 100 ml. of aqueous hydrochloric acid, pH 3, for 3 days at room temperature. The reaction mixture is neutralized with sodium carbonate and extracted 3 successive times with 50 ml. portions of chloroform. The combined chloroform extracts on evaporation gives AM–684–HP. The aqueous layer is evaporated to dryness and the residue extracted with 3 successive 50 ml. portions of boiling benzene. The combined extracts are evaporated to dryness, dissolved in chloroform and crystallized to give mycarose, a known sugar, having a molecular formula of $C_7H_{14}O_4$. The hydrolysis reaction of AM–684 formed AM–684–HP with an accompanying reduction in molecular size by the amount of $C_7H_{12}O_3$ as represented by the release of mycarose by cleavage of a glycosidic bond. AM–684–HP possesses high antibacterial activity as shown in the in vitro antimicrobial spectrum and the in vivo PPLO data given in Tables 9 and 12, respectively.

EXAMPLE 5.—THE HYDROCHLORIDE SALT AM-684

The compound of Example 3 is dissolved in ether and ethereal hydrogen chloride is added. A white precipitate results, which is recrystallized from acetone or ethanol-ether. The hydrochloride salt has a decomposition point of 139.5–142°, $[\alpha]_D^{25°}$ —39.6 (C=1.14 methanol), ultraviolet maximum at 282 m$\mu$ $$(E_{1\,cm.}^{1\%} = 241)$$

in methanol. There is no significant difference in in vitro activity between the hydrochloride salt of the compound and the free base. Other salts such as the tartrate are prepared in a similar manner.

EXAMPLE 6

The procedures of Examples 1 and 2 are repeated except that a culture of *S. griseospiralis* is used to grow the primary inoculum. The liquid inoculum and the fermentation medium are prepared according to the following formulas:

| Liquid inoculum: | Grams per liter |
|---|---|
| Soy bean oil meal | 10 |
| Corn steep liquor | 5 |
| Calcium carbonate | 3 |
| Glucose | 20 |
| Fermentation medium: | |
| Bactopeptone | 5 |
| Glucose | 10 |
| Molasses | 20 |
| Calcium carbonate | 1 |

Antibiotic AM-684 is isolated from the fermentation mash by the procedure described in Example 3.

The antibiotic AM-684 is not to be confused with the antibiotic known as Tylosin. The new antibiotic of this invention is readily distinguished from Tylosin by melting point and by paper and column chromatography.

We claim:

1. A substance selected from the group consisting of antibiotic AM-684, a basic compound effective in inhibiting the growth of gram-positive bacteria, said substance being soluble in lower alkanols, acetone, ethyl acetate, methyl isobutyl ketone, chloroform and methylene chloride, being less soluble in ether and water and being insoluble in hydrocarbons, said substance having the following average elemental analysis: C, 59.50, H, 8.71, N, 1.79, O, 29.35, said substance having a melting point of 172–174.5° C., optical rotation $[\alpha]_D^{25°} = -48.7°$ at a concentration of 0.906% in methanol, having a p$K_a$ value of 6.95 (66% dimethylformamide), having the following percent of methyl groups attached to oxygen 3.38, to carbon 10.27, to nitrogen 2.60, and the percent acetyl group is 2.51, said substance being characterized by absorption maxima in the ultraviolet at 282 m$\mu$ $$(E_{1\,cm.}^{1\%} = 245)$$

in methanol, said substance exhibiting characteristic absorption in the infrared region of the spectrum as shown in FIGURE 1 and a proton magnetic resonance spectrum as shown in FIGURE 2 and the acid salts of said basic substance.

2. Antibiotic AM-684 a substance effective in inhibiting the growth of gram-positive bacteria, said substance being a basic compound soluble in lower alkanols, acetone ethyl acetate, methyl isobutyl ketone, chloroform and methylene chloride, being less soluble in ether and water and being insoluble in hydrocarbons, said substance having the following average elemental analysis: C, 59.50, H, 8.71, N, 1.79, O, 29.35, said substance having a melting point of 172–174.5° C., optical rotation $$[\alpha]_D^{25°} = -48.7°$$

at a concentration of 0.906% in methanol, having a p$K_a$ value of 6.95 (66% dimethylformamide), having the following percent of methyl groups attached to oxygen 3.38, to carbon 10.27, to nitrogen 2.60, and the percent acetyl group is 2.51 said substance being characterized by absorption maxima in the ultraviolet at 282 m$\mu$ $$(E_{1\,cm.}^{1\%} = 245)$$

in methanol, and said substance exhibiting characteristic absorption in the infared region of the spectrum as shown in FIGURE 1 and a proton resonance spectrum as shown in FIGURE 2.

3. Antibiotic AM-684 according to claim 2 in its pure crystalline form.

4. Antibiotic AM-684-HP produced by the mild acid treatment in water at pH 3 of the product of claim 3.

5. A process for the production of antibiotic AM-684 which comprises cultivating a microorganism selected from the group consisting of *Streptomyces hygroscopicus* NRRL 3017 and *Streptomyces griseospiralis* NRRL 3018 in an aqueous nutrient medium containing assimilable sources of carbohydrate, nitrogen, and inorganic salts under submerged aerobic conditions until substantial antibiotic activity is imparted to said medium by production of antibiotic AM-684, and isolating antibiotic AM-684 from said medium.

6. A process for the production of antibiotic AM-684 which comprises cultivating *Streptomyces hygroscopicus* NRRL 3017 in an aqueous nutrient medium containing assimilable sources of carbohydrate, nitrogen, and inorganic salts, under submerged aerobic conditions for a period of from 80 to 150 hours, and at a temperature of from 20 to 35° C., and recovering the antibiotic AM-684 so produced.

7. A process for the production of antibiotic AM-684 which comprises cultivating *Streptomyces griesospiralis* NRRL 3018 in an aqueous nutrient medium containing assimilable sources of carbohydrate, nitrogen and inorganic salts, under submerged aerobic conditions for a period of from 80 to 150 hours, and at a temperature of from 20 to 35° C., and recovering the antibiotic AM-684 so produced.

8. A process as in claim 6 in which the antibiotic is recovered from the fermentation broth by filtering the broth, extracting the antibiotic activity from the beer filtrate with solvent, passing the antibiotic activity through a chromatographic column, and separating the antibiotic activity therefrom.

9. A process as in claim 7 in which the antibiotic is recovered from the fermentation broth by filtering the broth, extracting the antibiotic activity from the beer filtrate with solvent, passing the antibiotic activity through a chromatographic column, and separating the antibiotic activity therefrom.

References Cited

Hamill: Antibiotics and Chemotherapy, vol. 11, 1961, pages 328–334.

Pfizer: Handbook of Microbial Metabolites, 1961, pages 40, 125, 128, 575, 591.

SAM ROSEN, *Primary Examiner.*

JULIAN S. LEVITT, *Examiner.*